July 3, 1928.
F. S. CARR
FASTENER
1,675,791
Original Filed Feb. 26, 1925
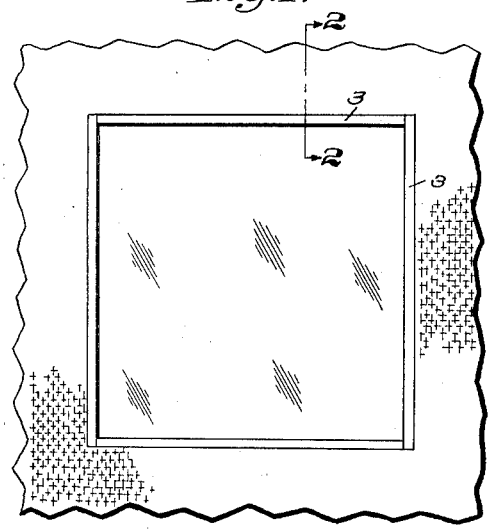
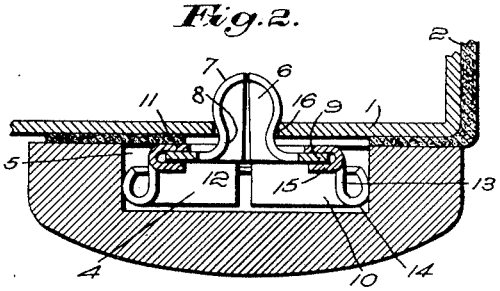
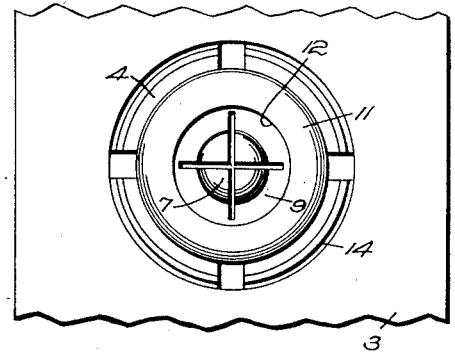
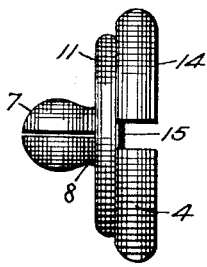
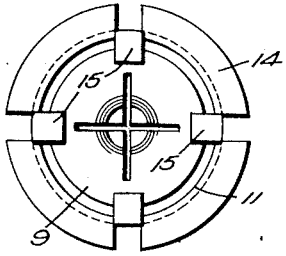
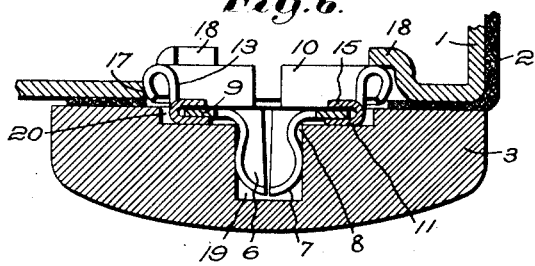
Inventor:
Fred S. Carr,
by Emery Booth Janney Varney
Attys Patented July 3, 1928.

1,675,791

UNITED STATES PATENT OFFICE.

FRED S. CARR, OF NEWTON, MASSACHUSETTS, ASSIGNOR TO CARR FASTENER COMPANY, OF CAMBRIDGE, MASSACHUSETTS, A CORPORATION OF MAINE.

FASTENER.

Original application filed February 26, 1925, Serial No. 11,699. Divided and this application filed August 25, 1925. Serial No. 52,321.

This invention aims to provide improvements in separable fasteners.

The application is a division of my prior application, Serial No. 11,699, filed February 26, 1925.

In the drawings, which illustrate two preferred embodiments of my invention:

Figure 1 is an elevation view of a window and window frame showing one use of my invention;

Fig. 2 is a section on the line 2—2 of Fig. 1, showing the trim strip secured to the window frame by stud and socket fastening means.

Fig. 3 is a plan view of a portion of the trim strip showing a stud unit secured thereto;

Fig. 4 is a side elevation of the stud unit shown in Fig. 3;

Fig. 5 is an elevation view of the stud unit, as viewed from the right of Fig. 4; and Fig. 6 is a section similar to Fig. 2, showing the stud unit reversed to secure the trim strip to the body part.

Referring to the drawings, I have shown a trimming installation which includes the usual body part or frame part 1, the upholstery fabric 2 and the wooden trim strips 3 secured together by a plurality of stud units 4, as best illustrated in Figs. 2 and 6.

Figs. 1 through 5 illustrate the first embodiment of my invention and show one manner in which the parts of the installation may be secured together by the use of the stud units as shown in Fig. 2.

The trim strips in this instance are formed from pieces of wood and present holes or recesses 5 at the inner faces thereof for reception of parts of the stud units, as hereinafter described.

The stud units which are used to secure the trim strip to the body part, include a stud part 6 having a rounded head 7 contractible and expansible for engagement with the body part 1, a neck 8 and a flat base portion 9. The unit also includes a second stud part 10, which is of much larger proportions than the stud part 6, as shown in Figs. 2 through 5. This stud part 10 has a base portion 11 having an aperture 12 therethrough, a wall 13 extending from the periphery of said base and a ring-like resilient portion 14 at the outer edge of the wall 13. When the two stud parts are assembled, the head 7 and neck 8 of the stud part 6 pass through the aperture 12 and are presented beyond the base 11. The base portion 9 seats against the base portion 11 and both stud parts are held in assembled relation by a plurality of ears 15 extending over the base 9 of the stud part 6. The base 9 is smaller in diameter than the diameter of the wall 13, and the aperture 12 is larger in diameter than the neck 8 of the stud part 6, thereby permitting lateral shifting of the stud parts relative to each other.

When the installation is completely assembled, as shown in Fig. 2, the neck 8 of the stud part 6 is engaged with the wall surrounding the stud-receiving aperture 16 in the body part and the base 11 of the stud part 10 seats against the upholstery 2 to hold it in place. The ringlike portion 14 of the stud part 10 frictionally grips the wall of the recess 5 to hold the trim strip in assembled relation with the rest of the installation. The ringlike portion holds better than the head 7 of the stud part 6, which passes through the aperture 16, because of its larger area, thereby permitting the smaller stud to separate from its aperture because that stud is easier to engage and disengage from the larger stud.

The trim strips are held in place by the friction between the compressed stud parts and the walls of the recesses 5. The largeness of the ringlike portion 14 also contributes to a great extent in preventing normal strains from tipping the strip out of engagement with the stud units.

If the recesses 5 do not align with the stud parts 10, these parts may shift automatically relative to the stud parts 6 for alignment with the recesses when the strip is pressed over the exposed portions of the stud units.

Referring now to Fig. 6, I have shown a trimming installation secured together by reversing the stud units. The frame part 1 is provided with a relatively large aperture 17 through which the ringlike portion 14 of the stud part 10 passes and a plurality of fingers 18 bent inwardly from the frame part to limit passage of the stud part 10 through the aperture 17. The wooden trim strip 3 is provided with a relatively small recess 19 for reception of the head 7 of the stud part 6 and a larger recess 20 is provided to receive the base 11 of the stud part 10 to permit the trim strip to fit tightly against the upholstery fabric 2.

The above described trimming installations are very simple and inexpensive, inasmuch as no sockets are necessary other than the stud-receiving apertures and recesses which can be formed in their respective parts with very little difficulty.

The friction between the stud parts and the walls of the recesses is sufficient to hold the trim strips in place even against normal strains exerted thereupon, thus providing an efficient, neat-appearing installation which can be easily and quickly assembled and disassembled.

While I have shown and described two embodiments of my invention, it will be understood that changes involving omission, substitution, alteration and even reversal of parts may be made without departing from the scope of my invention which is best defined in the appended claims.

Claims:

1. A separable fastener unit comprising, in combination, two resilient stud members secured together and facing in opposite directions, one of said stud members presenting a ringlike socket-engaging portion and said other stud presenting a ball-shaped socket-engaging portion, and means provided by said stud members to permit substantial lateral shifting of said stud members relative to each other for alignment with their cooperating stud-receiving apertures.

2. A separable fastener stud unit comprising, in combination, a stud presenting a relatively resilient socket-engaging portion and a relatively flat base portion presenting a relatively large aperture therethrough, a second stud member presenting a relatively smaller resilient socket-engaging portion than said first stud member and a laterally shiftable base portion fitting within the aperture of said first-mentioned base and a plurality of ears pressed from said first mentioned stud member and bent over said base, said smaller socket-engaging portion passing through the aperture in said base and facing in the opposite direction from said larger socket-engaging portion.

In testimony whereof, I have signed my name to this specification.

FRED S. CARR.